US008033165B2

(12) United States Patent
Kim et al.

(10) Patent No.: US 8,033,165 B2

(45) Date of Patent: Oct. 11, 2011

(54) METHOD FOR DETECTING COMBUSTION TIMING AND SYSTEM THEREOF

(75) Inventors: Jang Heon Kim, Suwon (KR); Kyoung Doug Min, Seoul (KR); Seung Mok Choi, Seoul (KR); Seonguk Kim, Seoul (KR)

(73) Assignees: Hyundai Motor Company, Seoul (KR); SNU R&DB Foundation, Seoul (KR)

( * ) Notice: Subject to any disclaimer, the term of this patent is extended or adjusted under 35 U.S.C. 154(b) by 161 days.

(21) Appl. No.: 12/552,213

(22) Filed: Sep. 1, 2009

(65) Prior Publication Data

US 2010/0132443 A1 Jun. 3, 2010

(30) Foreign Application Priority Data

Dec. 3, 2008 (KR) ........................ 10-2008-0122132

(51) Int. Cl.
*G01M 15/04* (2006.01)

(52) U.S. Cl. .................................. 73/114.26; 73/114.63

(58) Field of Classification Search .. 73/114.26–114.29, 73/114.63

See application file for complete search history.

(56) References Cited

U.S. PATENT DOCUMENTS

| | | | | |
|---|---|---|---|---|
| 4,523,567 | A * | 6/1985 | Iwata | 123/406.36 |
| 4,530,328 | A * | 7/1985 | Komurasaki | 123/406.36 |
| 4,643,023 | A * | 2/1987 | Capps | 73/114.07 |
| 5,836,285 | A * | 11/1998 | Aoki et al. | 123/406.37 |
| 6,456,927 | B1 * | 9/2002 | Frankowski et al. | 701/111 |
| 6,827,062 | B2 * | 12/2004 | Fukusako et al. | 123/406.33 |
| 6,923,046 | B2 * | 8/2005 | von Glowczewski et al. | 73/114.16 |
| 7,251,556 | B2 * | 7/2007 | Kaneko et al. | 701/111 |
| 7,653,477 | B2 * | 1/2010 | Yoshihara et al. | 701/111 |
| 7,904,230 | B2 * | 3/2011 | Niimi | 701/102 |
| 2006/0136117 | A1 * | 6/2006 | Kaneko et al. | 701/111 |
| 2009/0043484 | A1 * | 2/2009 | Yoshihara et al. | 701/111 |

* cited by examiner

*Primary Examiner* — Freddie Kirkland, III

(74) *Attorney, Agent, or Firm* — Morgan, Lewis & Bockius LLP

(57) ABSTRACT

An accelerator sensor that is mounted on an engine block may be used to detect vibration of a compression ignition engine, and the detected vibration signal is analyzed to determine the combustion timing of the engine. A method for detecting combustion timing may include measuring a block vibration signal generated in a combustion process of an engine, setting up a frequency area that is to be analyzed in the block vibration to divide the frequency area into wavelet scales, executing continuous wavelet transformations of the divided wavelet scales to extract respective result values thereof and to calculate differences between former result values and latter result values, comparing the calculated difference value with a predetermined value to store crank angles of pertinent timing if the calculated difference values exceed the predetermined value, and averaging the stored crank angles to determine combustion timing in a case that all wavelet scales are processed.

6 Claims, 4 Drawing Sheets

METHOD FOR DETECTING COMBUSTION TIMING AND SYSTEM THEREOF

CROSS-REFERENCE TO RELATED APPLICATION

The present application claims priority to Korean Patent Application No. 10-2008-0122132 filed on Dec. 3, 2008, the entire contents of which application is incorporated herein for all purposes by this reference.

BACKGROUND OF THE INVENTION

1. Field of the Invention

The present invention relates to a method for detecting combustion timing of an engine that analyzes an engine vibration signal that is measured so as to determine combustion timing of an engine, and a system thereof.

2. Description of Related Art

Unlike a conventional gasoline or diesel engine, in a direct injection compression ignition type of engine such as a homogeneous charge compression ignition (HCCI) engine and a controlled auto ignition (CAI) engine, factors that are related to the combustion are restricted such that an indirect control method is used to control the combustion thereof.

An important factor in the compression ignition engine that indirectly controls combustion timing is to determine how the combustion of the engine is progressing.

As techniques that directly analyze combustion, there are a method of measuring the pressure of the combustion chamber and a method using an ion probe.

In the method measuring the pressure of the combustion chamber, the released heat amount is calculated during combustion to accurately analyze the combustion process.

The method of using an ion probe measures the ion amount that is generated before and after the combustion to analyze the combustion progress of the combustion chamber.

In the above techniques for directly measuring the combustion, the combustion is measured through data that are extracted from sensors that are mounted inside the combustion chamber such that there is a merit of accurately analyzing the combustion progress.

However, when high temperature and high pressure conditions are repeated inside the combustion chamber, in a case that the sensors are directly exposed to the combustion fire, there is a problem that sufficient durability thereof cannot be achieved, and further the sensors are expensive such that it is difficult to apply to a mass produced vehicle in a practical aspect.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a method for detecting combustion timing and a system thereof having advantages of measuring a vibration signal of an engine block to glean accurate data regarding the combustion timing and use them as input data that are necessary for controlling the combustion such that the combustion is suitably controlled.

In an aspect of the present invention, a method for detecting combustion timing, may include a) measuring a vibration signal of an engine block that is generated in a combustion process of an engine, b) setting up a frequency area that is to be analyzed in the vibration signal of the engine block to divide the frequency area into wavelet scales, c) executing continuous wavelet transformations of the divided wavelet scales to extract respective result values thereof and to calculate difference values between former result values and latter result values, d) comparing the calculated difference values with a predetermined value to store crank angles of pertinent timing in a case that the calculated difference values exceed the predetermined value, and e) averaging stored crank angles to determine the combustion timing according to the averaged crank angle in a case that all wavelet scales are processed.

The method for detecting combustion timing may further include a step of returning to the step c) if a final wavelet scale is not processed after the step of d).

An acceleration sensor may be mounted on the engine block to measure the vibration signal.

The wavelet scale may be 100 Hz.

The engine may be ignited in a compressed condition in which a temperature inside a cylinder is higher than a predetermined ignition temperature.

In further another aspect of the present invention, a system for detecting combustion timing, may include an acceleration sensor that is mounted on one side of an engine block to detect block vibration according to combustion thereof, and an electronic control unit that divides the block vibration that is detected from the acceleration sensor into wavelet scales and operates a wavelet transformation thereof to determine the combustion timing of an engine.

The electronic control unit may set up a frequency area for analyzing the block vibration that is detected on the engine block to divide the block vibration into wavelet scales, operates wavelet transformation for the respective wavelet scales to extract a result value thereof, calculates a difference value between a result value of former scales and that of latter scales, store the crank angle of pertinent timing if the difference value exceeds a predetermined value, and averages crank angles in the frequency area to determine the combustion timing.

In the present invention as stated above, the vibration signal of the engine block is analyzed to accrue important data such as the combustion timing so as to control the direct injection compression ignition engine.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
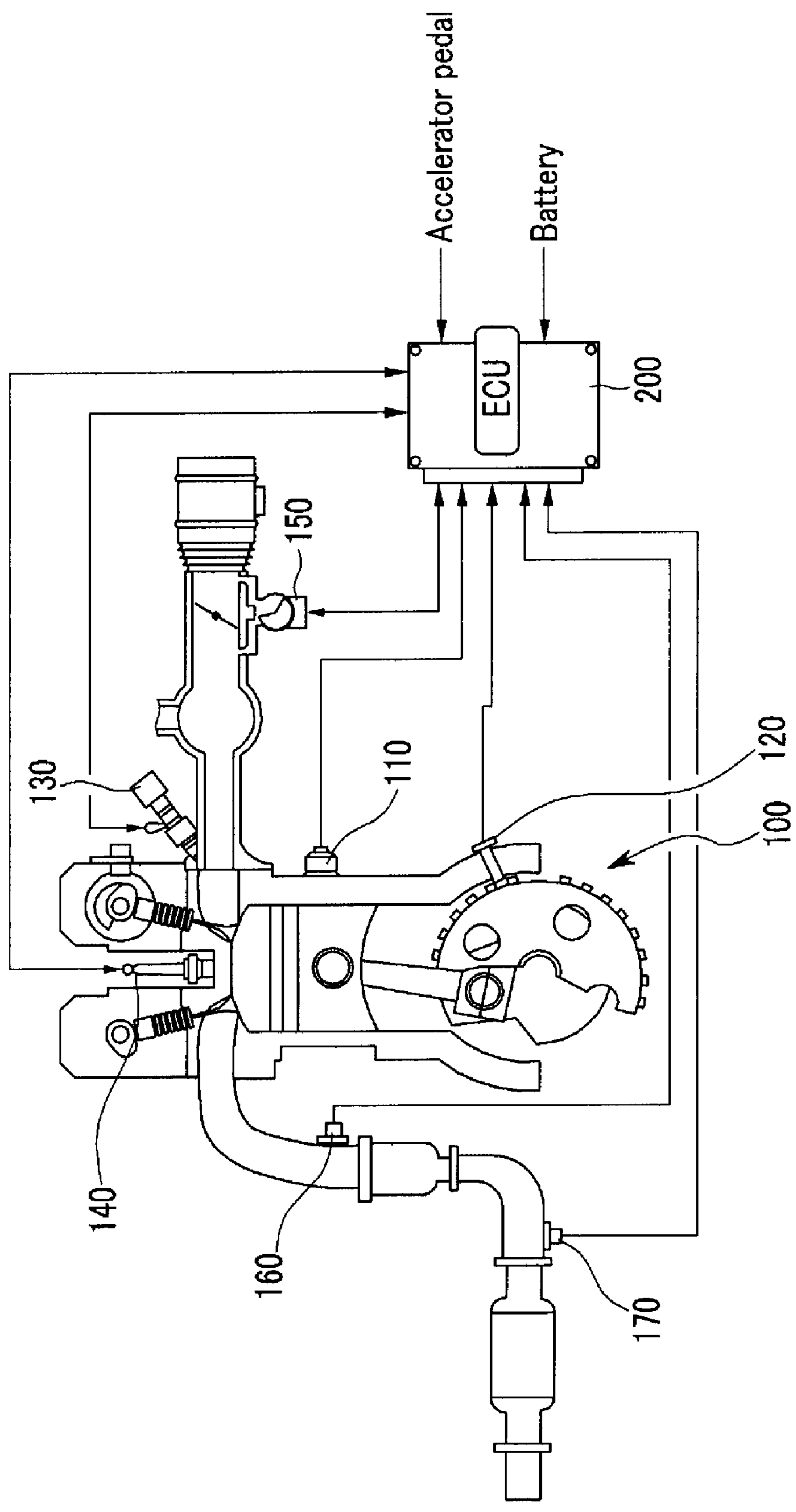
FIG. 1 is a schematic diagram showing a constitution of a device for determining the combustion timing of a compression ignition engine according to an exemplary embodiment of the present invention.
Figure 2:
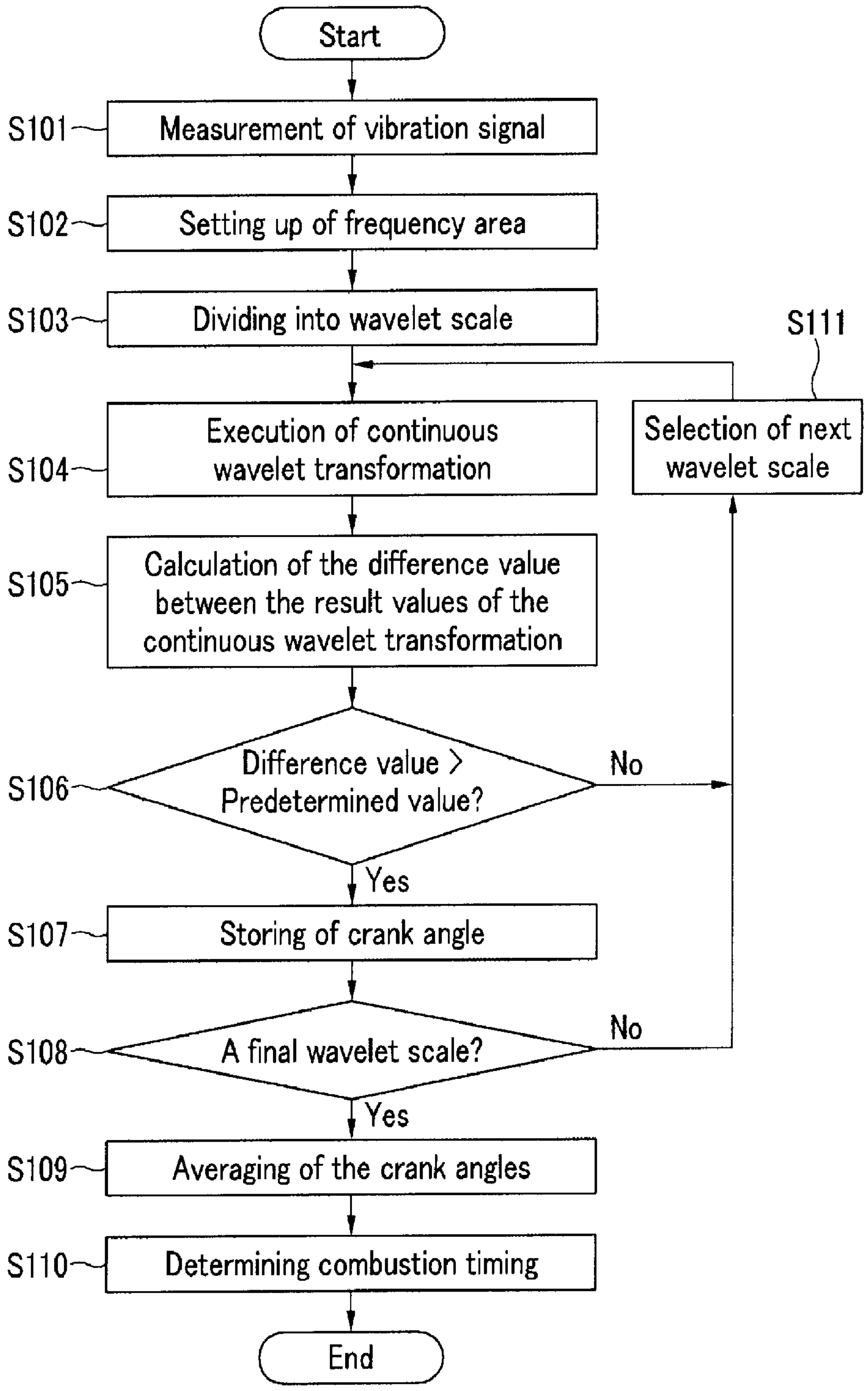
FIG. 2 is a flowchart showing determining procedures of the combustion timing of a compression ignition engine according to an exemplary embodiment of the present invention.

FIG. 1 is a schematic diagram showing a constitution of a device for determining the combustion timing of a compression ignition engine according to various embodiments of the present invention, and FIG. 2 is a flowchart showing determining procedures of the combustion timing of a compression ignition engine according to various embodiments of the present invention.

The present invention includes an engine 100 as a power source, an acceleration sensor 110, a crank angle sensor 120, an injector 130, a spark plug 140, an electronic throttle control (ETC) 150, a first oxygen sensor 160, a second oxygen sensor 170, and an electronic control unit (ECU) 200.

In various embodiments of the present invention, in a case that the engine is the compression ignition type, a spark plug is not provided. Further, the acceleration sensor can not only be applied to the compression ignition engine, but can also be applied to a general engine that is ignited by a spark plug according to various embodiments of the present invention.

The acceleration sensor 110 is mounted on one side of the upper of the engine block to detect vibration of the engine block that is generated from the combustion of the engine 100 and to transmit the signal thereof to the electronic control unit 200.

It is desirable that the mounting position of the acceleration sensor 110 is a place where noise except the engine block vibration can be excluded.

The crank angle sensor 120 detects the rotation position of the crankshaft to transmit the detected position signal to the electronic control unit 200.

The injector 130 injects a fuel amount that is determined corresponding to the driving conditions into the combustion chamber.

In the engine in which the spark plug is disposed, the spark plug 140 ignites the compressed air/fuel mixture according to the control of the electronic control unit 200.

The ETC 150 is operated by the control signal that is transferred from the electronic control unit 200 according to the position variation of an accelerator pedal (not shown) to adjust the opening rate of a throttle valve, that is, the intake air amount.

The first oxygen sensor 160 that is mounted upstream of a catalyst detects the oxygen concentration that is included in the exhaust gas to transfer air/fuel ratio data to the electronic control unit 200.

The second oxygen sensor 170 that is mounted downstream of the catalyst detects the oxygen concentration that is included in the purified exhaust gas to transfer the pertinent data electronic control unit 200.

The electronic control unit 200 operates wavelet transformation of the vibration signal of the engine block that is measured from the acceleration sensor 110 according to the combustion of the engine, analyzes the results thereof to determine the combustion timing, and uses it as input data for controlling the combustion of the engine.

The composition that is stated above can be applied to an HCCI engine, and the detail operation for using the acceleration sensor 110 will be described so as to determine the combustion timing in the present invention.

The direct injection compression ignition engine 100 according to the present invention is started, and the electronic control unit 200 detects vibration of the engine block that is generated from the combustion of the engine 100 from the acceleration sensor 110 in a S101.

Next, the frequency area is set up in the vibration of the engine block that is detected through the acceleration sensor 110 in S102, and it is divided into wavelet scales respectively having a predetermined unit, desirably 100 Hz, in S103.

The divided wavelet scales are processed through a wavelet transformation, and a variation of the frequency according to time, that is, a variation of the engine block vibration, is calculated in S104.

Further, the respective wavelet scales are sequentially transformed into a frequency to gain a resulting scale value, a difference value between a former scale value and a latter scale value is calculated in S105, and it is determined whether the difference value exceeds a predetermined value in S106.

If the difference value does not exceed the predetermined value in S106, the result value of the next wavelet scale is selected in S111 to return to the above S104, and if the difference value exceeds the predetermined value, the pertinent crank angle is stored in S107.

Referring to the details that are stated above, a variation of the scale value that is larger than the predetermined value indicates that the combustion/explosion is occurring, and a variation of the scale value that is smaller than the predetermined value indicates that the combustion/explosion is not occurring.

In various embodiments of the present invention, while the combustion/explosion is occurring, that is, while the variation of the scale value is larger than the predetermined value, the rotation angle of the crank is detected.

It is determined whether the entire frequency that is divided into wavelet scales in S103 is entirely processed or not in S108, and if the final wavelet scale is not processed, the latter wavelet scale is selected S111 to be returned to the above S104.

However, if the final wavelet scale is processed in S108, the stored crank angles are averaged in S109, and the combustion timing is determined according to the averaged crank angle in S110.

If the combustion timing is set up from the averaged crank angle as stated above, it is applied in controlling the combustion of the engine 100 such that the direct injection compression ignition engine can be safely and reliably controlled. That is, if the combustion timing is earlier than a predetermined timing, the electronic control unit can retard the fuel injection timing, and if the combustion timing is later than a predetermined timing, the electronic control unit can advance the fuel injection timing.

Figure 3:
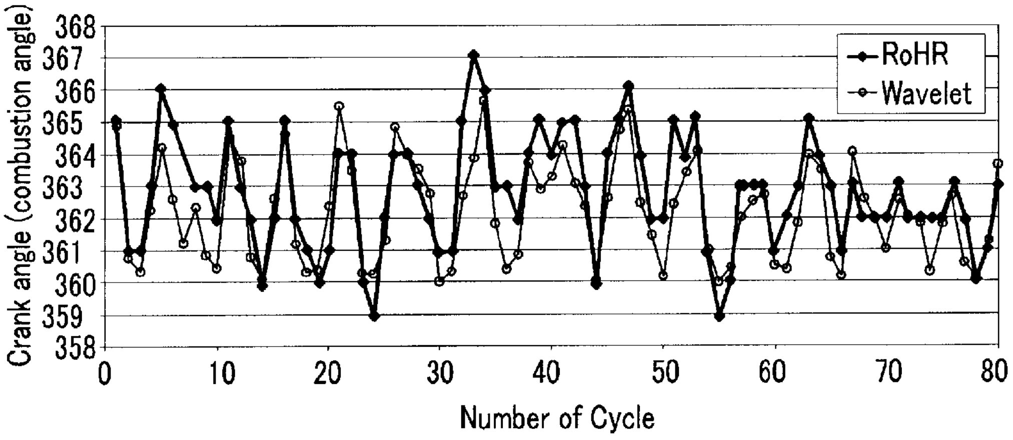
FIG. 3 is a graph showing a comparison result between combustion timing determined through wavelet transformation and combustion timing determined through a released heat amount that is calculated from combustion pressure in a 1500 RPM condition of a compression ignition engine according to an exemplary embodiment of the present invention.
Figure 4:
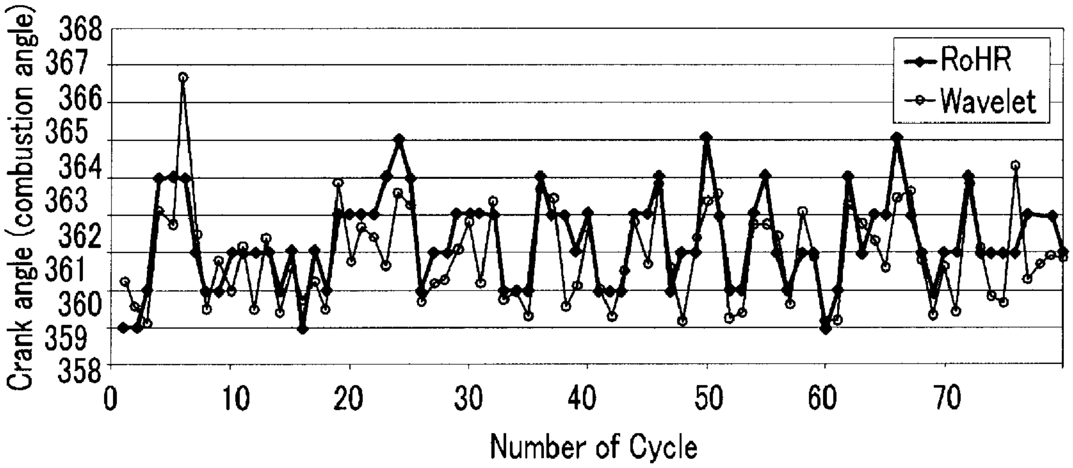
FIG. 4 is a graph showing a comparison result between combustion timing determined through wavelet transformation and combustion timing determined through a released heat amount that is calculated from combustion pressure in a 2000 RPM condition of a compression ignition engine according to an exemplary embodiment of the present invention.

FIG. 3 and FIG. 4 show comparison the combustion timings that are calculated through wavelet transformations of the vibration signal of a gasoline HCCI engine having one cylinder in conditions of 1500 rpm and 2000 rpm with the combustion timings that are calculated through the combustion pressure and the heat emission amount.

The vibration signals of the engine block are analyzed in a frequency area ranging from 500 Hz to 4 kHz that is known as effectively reflecting the vibration signal that is generated from the combustion of the compression ignition engine so as to determine the combustion timing.

When the two signals are compared, it can be known that the combustion timing through the wavelet transformation and the combustion timing through the heat emission amount, which is calculated from the combustion pressure, are equal or have similar values.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for detecting combustion timing, comprising:

a) measuring a vibration signal of an engine block that is generated in a combustion process of an engine;

b) setting up a frequency area that is to be analyzed in the vibration signal of the engine block to divide the frequency area into wavelet scales;

c) executing continuous wavelet transformations of the divided wavelet scales to extract respective result values thereof and to calculate difference values between former result values and latter result values;

d) comparing the calculated difference values with a predetermined value to store crank angles of pertinent timing in a case that the calculated difference values exceed the predetermined value; and e) averaging stored crank angles to determine the combustion timing according to the averaged crank angle in a case that all wavelet scales are processed.

2. The method for detecting combustion timing of claim 1, further including a step of returning to the step c) if a final wavelet scale is not processed after the step of d).

3. The method for detecting combustion timing of claim 1, wherein an acceleration sensor is mounted on the engine block to measure the vibration signal.

4. The method for detecting combustion timing of claim 1, wherein the wavelet scale is 100 Hz.

5. The method for detecting combustion timing of claim 1, wherein the engine is ignited in a compressed condition in which a temperature inside a cylinder is higher than a predetermined ignition temperature.

6. A system for detecting combustion timing, comprising:

an acceleration sensor that is mounted on one side of an engine block to detect block vibration according to combustion thereof; and an electronic control unit that divides the block vibration that is detected from the acceleration sensor into wavelet scales and operates a wavelet transformation thereof to determine the combustion timing of an engine;

wherein the electronic control unit sets up a frequency area for analyzing the block vibration that is detected on the engine block to divide the block vibration into wavelet scales, operates wavelet transformation for the respective wavelet scales to extract a result value thereof, calculates a difference value between a result value of former scales and that of latter scales, store the crank angle of pertinent timing if the difference value exceeds a predetermined value, and averages crank angles in the frequency area to determine the combustion timing.

* * * * *